(12) United States Patent
Smith et al.

(10) Patent No.: US 8,616,777 B1
(45) Date of Patent: Dec. 31, 2013

(54) BEARING ASSEMBLY WITH INNER RING

(71) Applicant: Pratt & Whitney Canada Corp., Longueuil (CA)

(72) Inventors: Alexander Smith, Laval (CA); Haw On Tam, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 13/678,803

(22) Filed: Nov. 16, 2012

(51) Int. Cl.
*F16C 33/66* (2006.01)

(52) U.S. Cl.
USPC .......................................................... 384/475

(58) Field of Classification Search
USPC ........................................ 384/462, 473–475
See application file for complete search history.

(56) References Cited

U.S. PATENT DOCUMENTS

| | | | |
|---|---|---|---|
| 3,531,167 A | 9/1970 | Blea et al. |
| 3,915,521 A | 10/1975 | Young |
| 4,265,334 A | 5/1981 | Benhase, Jr. |
| 4,294,069 A | 10/1981 | Camp |
| 4,334,720 A | 6/1982 | Signer |
| 4,414,807 A | 11/1983 | Kerr |
| 4,463,994 A | 8/1984 | Eliason et al. |
| 4,523,863 A | 6/1985 | Okoshi |
| 4,648,485 A | 3/1987 | Kovaleski |
| 5,017,022 A | 5/1991 | Ruggles et al. |
| 5,106,209 A | 4/1992 | Atkinson et al. |
| 5,183,342 A | 2/1993 | Daiber et al. |
| 5,246,352 A | 9/1993 | Kawakami |
| 5,480,232 A | 1/1996 | Lendway |
| 5,489,190 A | 2/1996 | Sullivan |
| 5,533,814 A | 7/1996 | Slocum |
| 5,582,413 A | 12/1996 | Lendway |
| 5,683,224 A | 11/1997 | Sebald et al. |
| 5,944,429 A | 8/1999 | Berry |
| 6,141,951 A | 11/2000 | Krukoski et al. |
| 6,409,464 B1 | 6/2002 | Fisher et al. |
| 6,473,705 B1 | 10/2002 | Conners |
| 6,511,228 B2 | 1/2003 | Dusza |
| 6,725,720 B2 | 4/2004 | Kiuchi et al. |
| 6,877,950 B2 | 4/2005 | Liu |
| 7,070,333 B2 | 7/2006 | Ito et al. |
| 7,124,857 B2 | 10/2006 | Gekht et al. |
| 7,178,987 B2 | 2/2007 | Bridges et al. |
| 7,244,096 B2 | 7/2007 | Dins et al. |
| 7,318,884 B2 | 1/2008 | Mielke |

(Continued)

FOREIGN PATENT DOCUMENTS

| | | |
|---|---|---|
| EP | 1640627 | 3/2006 |
| FR | 2934640 | 2/2010 |

(Continued)

*Primary Examiner* — Phillip A Johnson
(74) *Attorney, Agent, or Firm* — Norton Rose Fulbright Canada

(57) ABSTRACT

An inner ring for a bearing assembly with an inner surface having a plurality of circumferentially spaced axial slots defined therein each having a flat axially extending bottom wall and a plurality of circumferentially spaced partial circumferential slots defined therein each intersecting one of the axial slots and extending circumferentially therefrom around a respective portion of a circumference of the inner surface, shoulder radial holes extending therethrough each from a respective one of the circumferential slots to a corresponding one of the shoulders, and race radial holes extending therethrough each from a respective one of the circumferential slots to a corresponding corner of the inner race. The radial holes are circumferentially offset from the axial slots. A bearing assembly and a method of lubricating such an assembly are also discussed.

20 Claims, 4 Drawing Sheets

(56) References Cited

U.S. PATENT DOCUMENTS

| | | | |
|---|---|---|---|
| 7,410,341 B2 | 8/2008 | Gockel et al. | |
| 7,488,112 B2 * | 2/2009 | Bouiller et al. | 384/561 |
| 7,500,311 B2 | 3/2009 | Shimomura | |
| 7,568,843 B2 | 8/2009 | Lefebvre et al. | |
| 7,625,126 B2 | 12/2009 | Peters et al. | |
| 7,699,530 B2 | 4/2010 | Blais | |
| 7,793,499 B2 | 9/2010 | Gutknecht | |
| 7,819,587 B2 | 10/2010 | Akamatsu et al. | |
| 7,878,303 B2 | 2/2011 | Munson | |
| 7,905,495 B2 | 3/2011 | Munson | |
| 7,931,407 B2 | 4/2011 | Begin et al. | |
| 7,946,590 B2 | 5/2011 | Dobek et al. | |
| 7,984,911 B2 | 7/2011 | Dobek et al. | |
| 8,066,472 B2 | 11/2011 | Coffin et al. | |
| 8,147,145 B2 | 4/2012 | Inoue et al. | |
| 8,297,849 B2 * | 10/2012 | Uranishi | 384/475 |
| 2006/0062504 A1 | 3/2006 | Wilton et al. | |
| 2006/0153483 A1 * | 7/2006 | Bridges et al. | 384/475 |
| 2006/0193545 A1 | 8/2006 | Bridges et al. | |
| 2008/0135336 A1 | 6/2008 | Jewess et al. | |
| 2009/0208151 A1 | 8/2009 | Dobek et al. | |
| 2009/0245997 A1 | 10/2009 | Hurwitz et al. | |
| 2009/0304316 A1 | 12/2009 | Hattori et al. | |
| 2010/0002967 A1 | 1/2010 | Dettmar et al. | |
| 2010/0202720 A1 | 8/2010 | Kobayashi et al. | |
| 2010/0269512 A1 | 10/2010 | Morford et al. | |
| 2012/0027570 A1 | 2/2012 | Cigal et al. | |
| 2012/0076450 A1 | 3/2012 | Suma | |
| 2012/0183427 A1 | 7/2012 | Schelonka | |
| 2012/0189235 A1 * | 7/2012 | McNeil et al. | 384/475 |
| 2013/0004109 A1 | 1/2013 | Metzger et al. | |

FOREIGN PATENT DOCUMENTS

| | | | |
|---|---|---|---|
| JP | 2002122143 | | 4/2002 |
| JP | 2004092878 | | 3/2004 |
| JP | 2005308107 A | * | 11/2005 |
| JP | 2006112499 | | 4/2006 |
| JP | 2006138353 | | 6/2006 |
| JP | 2008121755 A | * | 5/2008 |

* cited by examiner

BEARING ASSEMBLY WITH INNER RING

TECHNICAL FIELD

The application relates generally to bearing assemblies and, more particularly, to an inner ring for such an assembly.

BACKGROUND OF THE ART

To reduce wear on bearing assemblies such as those used in gas turbine engines, lubricating fluid such as oil is typically used to keep them cool and clean. Lubricating fluid may be delivered by being channeled under the bearing, for example through circular axial slots formed on an inside surface of an inner ring of the bearing assembly, with radial holes extending through the inner ring to intersect the axial slots. However, the intersection between the radial holes and the axial slots typically produce zones of stress concentrations which may limit the speeds at which the bearing assembly may be used. In addition, the efficiency of the oil distribution may be limited.

SUMMARY

In one aspect, there is provided a bearing assembly comprising: an outer ring having an inner surface including an outer race; an inner ring concentric with and surrounded by the outer ring, the inner ring having an outer surface including two axially spaced apart shoulders and an inner race defined between the shoulders, the inner race being complementary to the outer race, and an inner surface having a plurality of circumferentially spaced axial slots with a flat bottom wall defined therein, the inner surface also having a plurality of circumferentially spaced partial circumferential slots defined therein each intersecting one of the axial slots and extending circumferentially therefrom, and the inner ring further having shoulder radial holes extending therethrough each from a respective one of the circumferential slots to a corresponding one of the shoulders, and race radial holes extending therethrough each from a respective one of the circumferential slots to a corresponding corner of the inner race, the radial holes being circumferentially offset from the axial slots; a cage member received between the outer and inner rings and abutting the shoulders of the inner ring; and a plurality of bearing elements supported by the cage member and received between the outer race and the inner race, the bearing elements allowing relative rotational motion between the outer and inner rings.

In another aspect, there is provided an inner ring for a bearing assembly, the inner ring comprising: an outer surface defining an inner race extending between two circumferential shoulders; an inner surface concentric with the outer surface and located radially inwardly thereof, the inner surface having a plurality of circumferentially spaced axial slots defined therein each having a flat axially extending bottom wall, and a plurality of circumferentially spaced partial circumferential slots defined therein each intersecting one of the axial slots and extending circumferentially therefrom around a respective portion of a circumference of the inner surface; the inner ring having shoulder radial holes extending therethrough each from a respective one of the circumferential slots to a corresponding one of the shoulders; the inner ring having race radial holes extending therethrough each from a respective one of the circumferential slots to a corresponding corner of the inner race; and the radial holes being circumferentially offset from the axial slots.

In a further aspect, there is provided a method of lubricating a bearing assembly having a cage member retaining a plurality of bearing elements, the method comprising: circulating a lubricating fluid axially along an inner surface of an inner ring of the bearing assembly following a plurality of distinct first paths; circulating the lubricating fluid circumferentially from the first paths along the inner surface following a plurality of distinct second paths; circulating the lubricating fluid radially from some of the second paths through the inner ring directly to shoulders defined in an outer surface of the inner ring and receiving the cage member; and circulating the lubricating fluid radially from the remaining second paths through the inner ring directly to corners of an inner race defined in the outer surface and receiving the bearing elements.

DESCRIPTION OF THE DRAWINGS

Reference is now made to the accompanying figures in which.

DETAILED DESCRIPTION

Figure 1:
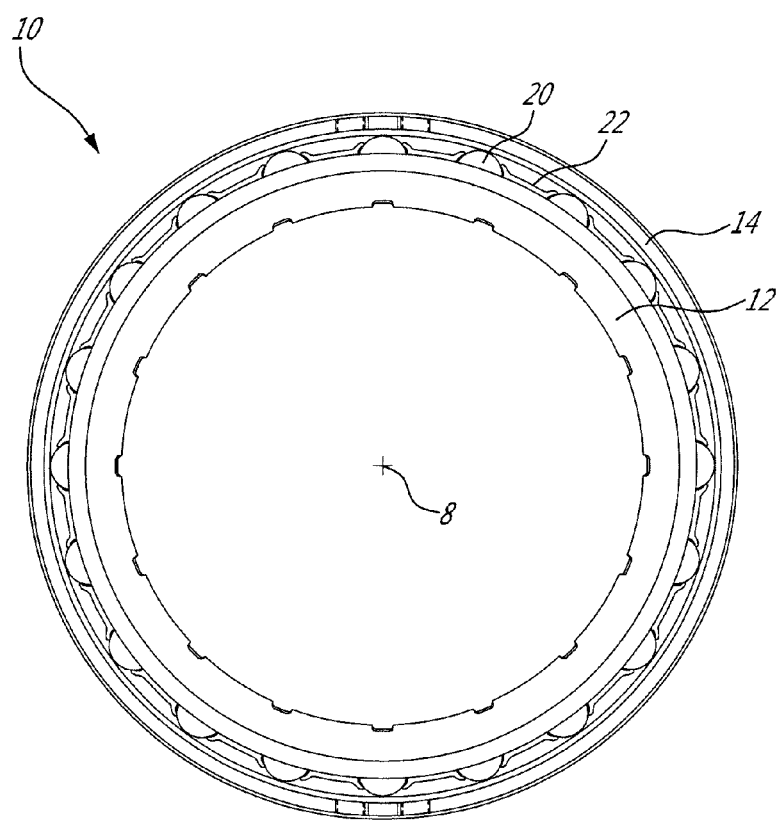
FIG. 1 is a schematic front view of a bearing assembly in accordance with a particular embodiment.
Figure 2:
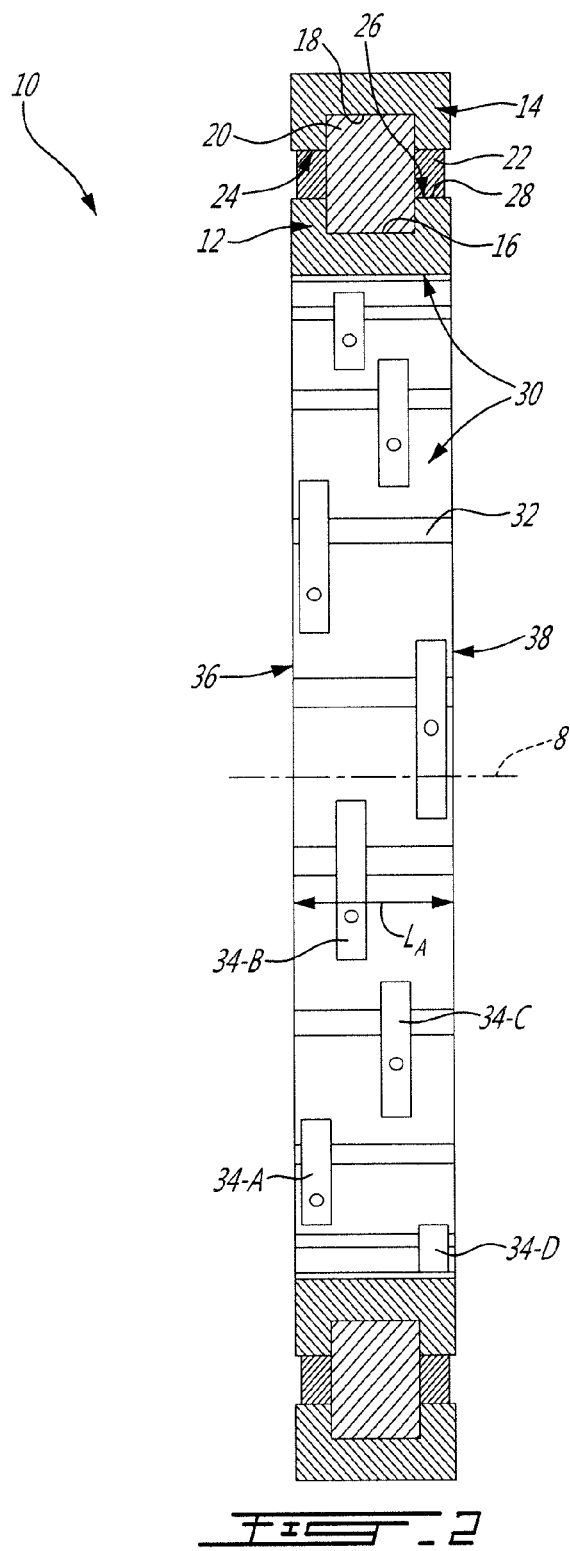
FIG. 2 is a schematic cross-sectional side view of the bearing assembly of FIG. 1.

Referring to FIGS. 1-2, a bearing assembly 10 in accordance with a particular embodiment is shown. The bearing assembly 10 generally includes concentric inner and outer rings 12, 14 respectively defining complementary inner and outer races 16, 18, in which a plurality of bearing elements 20 retained by a cage member 22 are received to allow relative rotation between the inner and outer rings 12, 14. In the embodiments shown, the bearing elements 20 are roller bearings, but it is understood that other adequate types of bearing elements can alternately be used, such as for example ball bearings and tapered bearings. The cage member 22 is received between the inner and outer rings 12, 14 and equally spaces the bearing elements 20 apart such that each bearing element 20 rotates around the inner and outer races 16, 18 without contacting the other bearing elements 20.

Referring more particularly to FIG. 2, the outer ring 14 is centered on a central axis 8 of the bearing assembly 10, with the outer race 18 being defined on an inner surface 24 thereof around its circumference. Although not shown in FIG. 2, the inner surface 24 may be at the same diameter as the outer race 18. The inner ring 12 is also centered on the central axis 8 of the bearing assembly 10, with the inner race 16 being defined on an outer surface 26 thereof around its circumference. The outer surface 26 of the inner ring 12 includes two annular shoulders 28 also extending around its circumference, with the inner race 16 being defined between the shoulders 28.

Referring to FIGS. 2-5, the inner surface 30 of the inner ring 12 includes a plurality of axial and partial circumferential slots 32, 34 defined therein.

The axial slots 32 have a length $L_A$ (FIG. 2) defined along the axial direction of the bearing assembly 10, a width $W_A$ (FIG. 4) defined along the circumferential direction, and a depth $D_A$ (FIG. 4) defined along the radial direction. In the embodiment shown, the axial slots 32 are regularly spaced apart around the circumference of the inner ring 12, and each axial slot 32 extends straight across the inner surface 30 from a first end 36 to a second end 38 of the inner ring 12. All the axial slots 32 have a same width $W_A$ and a same depth $D_A$. Other configurations are also possible.

Figure 3:
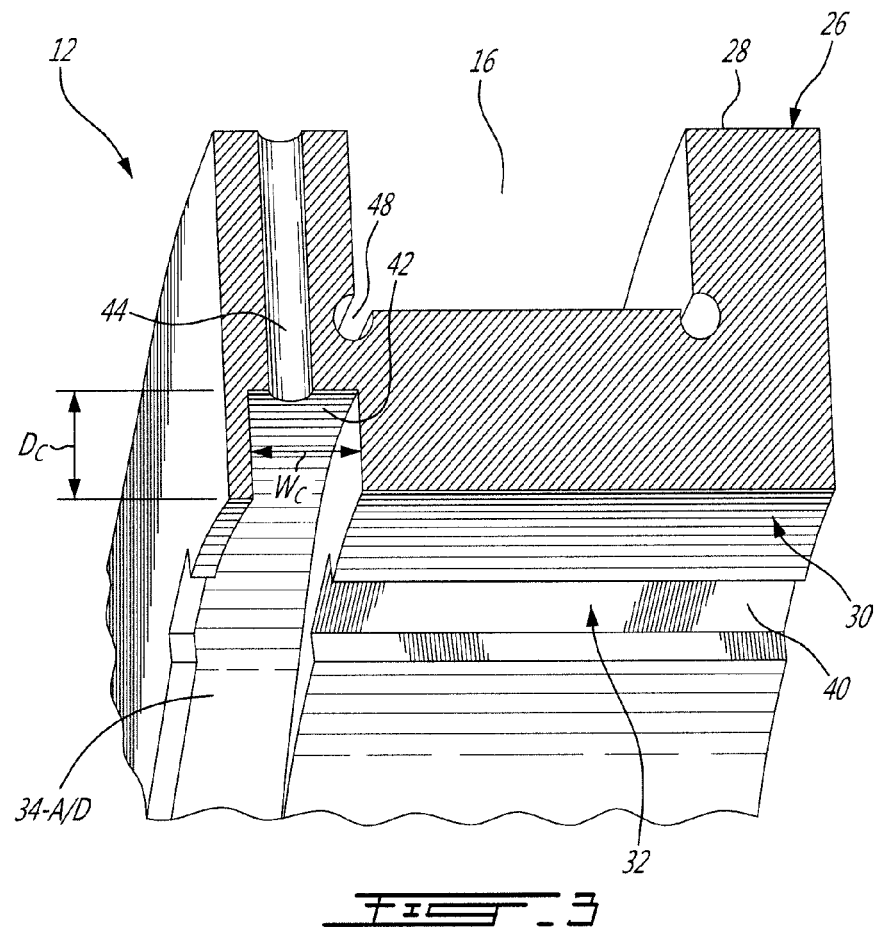
FIG. 3 is a schematic tridimensional view of a cross-section of part of an inner ring of the bearing assembly of FIG. 1.
Figure 4:
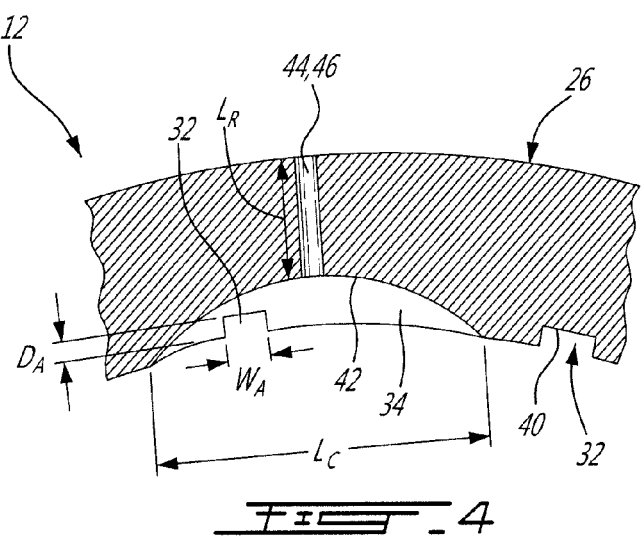
FIG. 4 is a schematic front cross-sectional view of part of the inner ring of FIG. 3.
Figure 5:
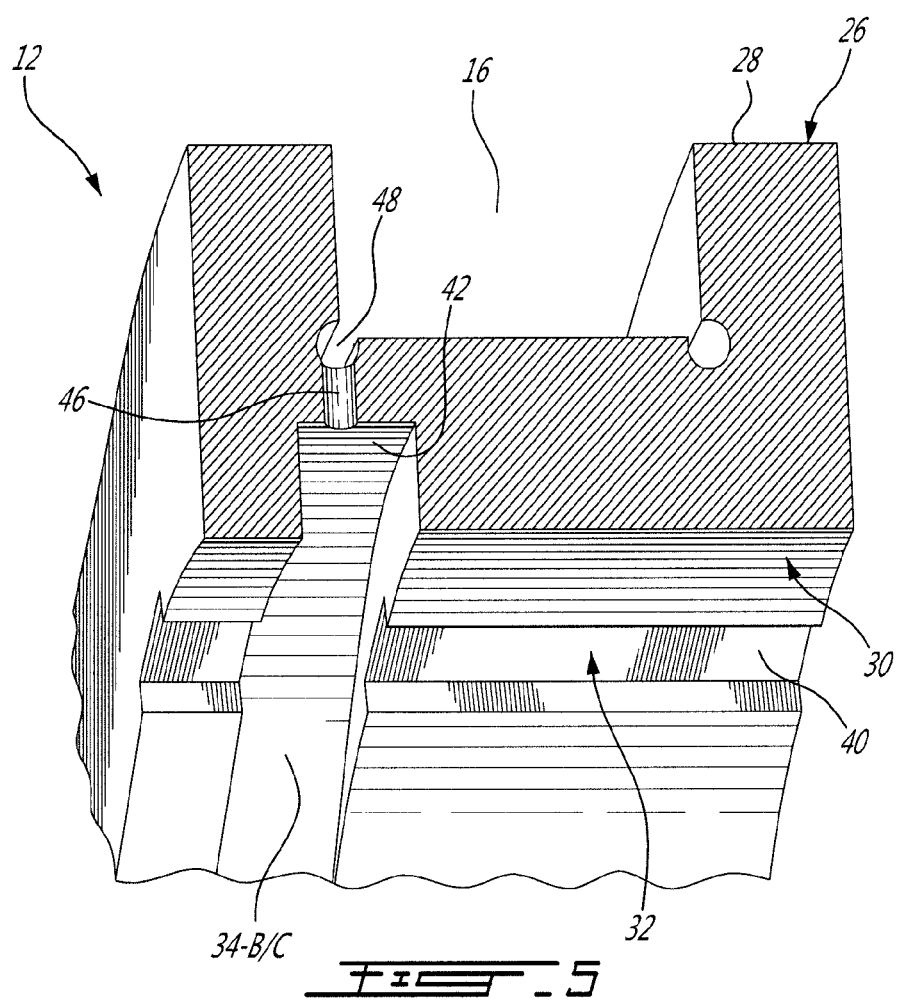
FIG. 5 is a schematic tridimensional view of another cross-section of part of the inner ring of the bearing assembly of FIG. 1.

As can be seen more clearly in FIGS. 3-5, the axial slots 32 have a cross-section defining a flat bottom wall 40. In the embodiment shown, the axial slots 32 have a rectangular cross-section, and are defined with a constant depth $D_A$ across their length $L_A$. In another embodiment, the axial slots 32 may be tapered, having a depth $D_A$ varying across their length $L_A$.

The partial circumferential slots 34 have a length $L_C$ (FIG. 4) defined along the circumferential direction of the bearing assembly 10, a width $W_C$ (FIG. 3) defined along the axial direction, and a depth $D_C$ (FIG. 3) defined along the radial direction. As can be seen more clearly in FIG. 4, the partial circumferential slots 34 have a depth $D_C$ varying across their length, defined by a circular bottom wall 42 having a center of curvature offset from the central axis 8 of the bearing assembly 10 and a smaller radius than that of the inner surface 30 of the inner ring 12. The partial circumferential slots 34 also have a rectangular cross-section defined perpendicularly to their length $L_C$. Each partial circumferential slot 34 extends circumferentially across and in fluid communication with a respective one of the axial slots 32, around a portion of the circumference greater than that of the respective axial slot 32 such as to extend circumferentially therefrom, i.e. the length $L_C$ of each partial circumferential slot 34 is greater than the width $W_A$ of the corresponding axial slot 32. In the embodiment shown, all the partial circumferential slots 34 have a same length $L_C$ and have a same maximum depth $D_C$. Alternately, partial circumferential slots 34 with different geometries from one another may be provided.

The partial circumferential slots 34 are disposed into four sets: first and second sets A, B closer to the first end 36 of the inner ring 12, axially offset from one another with the first set A being closest to the first end 36, and third and fourth sets C, D closer to the second end 38 of the inner ring 12, axially offset from one another with the fourth set D being closest to the second end 38. In the embodiment shown, each set A, B, C, D includes the same number of partial circumferential slots 34, and the slots 34 are equally spaced apart circumferentially and disposed such as to alternate between the four sets A, B, C, D around the circumference of the inner ring 12, i.e. the partial circumferential slots 34 from the four sets A, B, C, D are staggered. The axial distance between the partial circumferential slots 34 of the first set A and the first end 36 of the inner ring 12 and the axial distance between the partial circumferential slots 34 of the fourth set D and the second end 38 of the inner ring 12 are the same. The axial distance between the partial circumferential slots 34 of the second set B and the first end 36 of the inner ring 12 and the axial distance between the partial circumferential slots 34 of the third set C and the second end 38 of the inner ring 12 are the same. Other configurations are of course possible. In the particular embodiment shown, each set A, B, C, D includes four (4) partial circumferential slots 34 for a total of sixteen (16) partial circumferential slots 34, and sixteen (16) axial slots 32 are provided; alternately, more or less slots 32, 34 may be provided.

The axial and partial circumferential slots 32, 34 extend radially into the inner ring 12 without penetrating the outer surface 26 and the inner race 16 defined therein. Each axial slot 32 extends radially into the inner ring 12 a distance less than that of the corresponding partial circumferential slot 34, i.e. the depth $D_A$ of the axial slots 32 is smaller than the maximum depth $D_C$ of the partial circumferential slots 34.

Referring to FIGS. 3-5, the inner ring 12 also includes a plurality of radial holes 44, 46 defined therethrough, with one radial hole 44, 46 extending from each partial circumferential slot 34 in fluid communication therewith. The radial holes 44, 46 have a length $L_R$ (FIG. 4) defined along the radial direction. Each radial hole 44, 46 is circumferentially offset with respect to the axial slot 32 crossing the partial circumferential slot 34 in which the radial hole 44, 46 is defined, i.e. the radial hole 44, 46 is located in the portion of the partial circumferential slot 34 extending from the axial slot 32.

The radial holes 44, 46 are defined as shoulder radial holes 44 and race radial holes 46 depending on their position. Referring particularly to FIG. 3, each partial circumferential slot 34 of the first and fourth sets A, D has a shoulder radial hole 44 extending from the surface of its bottom wall 42, the shoulder radial holes 44 extending through the inner ring 12 to the outer surface 26 along one of the shoulders 28 bordering the inner race 16. The shoulder radial holes 44 feed the lubricating fluid to the cage piloting surface at the shoulder 28. In a particular embodiment, the shoulder radial holes 44 are positioned such as to be overlapped by the cage member 22 in any position thereof when the bearing elements 20 are received within the inner race 16.

Referring particularly to FIG. 5, each partial circumferential slot 34 of the second and third sets B, C has a race radial hole 46 extending from the surface of its bottom wall 42, the race radial holes 46 extending through the inner ring 12 to a corner of the inner race 16. In the embodiment shown, a circumferential groove 48 is defined along each corner of the inner race 16, and the race radial holes 46 extend to the respective one of these two grooves 48. The race radial holes 46 provide lubricating fluid directly to the bearing element 20 and the inner race contact interface.

In a particular embodiment, all the radial holes 44, 46 have the same diameter, and have a constant diameter across their length $L_R$, i.e. from the communication with the corresponding partial circumferential slot 34 to the communication with the surface of the shoulder 28 or with the corner of the inner race 16. In a particular embodiment, the radial holes 44, 46 include a same number of the race radial holes 46 and of the shoulder radial holes 44.

The partial circumferential slots 34, axial slots 32, and radial holes 44, 46 function together as a series of fluid passages to deliver lubricating fluid to the bearing assembly 10. Once the inner ring 12 has been mounted to a shaft, lubricating fluid is circulated to the inner ring 12, for example from a radial scoop or an axial scoop depending on the space available for the bearing assembly 10. The lubricating fluid is first circulated axially along the inner surface 30 of the inner ring 12 following a plurality of distinct first paths defined by the axial slots 32, then from these first paths following a plurality of distinct second paths defined by the partial circumferential slots 34. The lubricating fluid is then circulated radially from the partial circumferential slots 34 of the first and fourth sets A, D through the inner ring 12 directly to the shoulders 28 receiving the cage member 22, through the shoulder radial holes 44, and radially from the partial circumferential slots 34 of the second and third sets B, C through the inner ring 12 directly to the corners of the inner race 16, through the race radial holes 46.

In a particular embodiment, the intersection of the radial holes 44, 46 with the partial circumferential slots 34 (as opposed to with axial slots 32) and the flat bottom wall 40 of the axial slots 32 both allow to reduce the concentration of hoop stresses in the inner ring 12, while the combination of radial holes 44, 46 leading to the shoulders 28 of the bearing assembly 10 and leading to the corners of the inner race 16 allows to improve lubrication of the bearing assembly 10 for an effective and thorough lubricating scheme. Accordingly, the bearing assembly 10 may be able to be operated at higher rotational speeds.

Although not shown, additional axial slots not intersected by the partial circumferential slots 34 may be provided to direct lubricating fluid through the bearing assembly 10 to lubricate and/or cool other parts mated with the bearing assembly 10 or disposed within a larger assembly incorporating the bearing assembly 10.

EXAMPLE

The stress concentration factor Kt at the intersection of the radial hole 44, 46 and partial circumferential slot 34 of a bearing inner ring 12 such as that shown in FIGS. 1-5 and described above was calculated using CATIA V5. Parabolic elements were used and areas of high stress were refined. Two 3D models were used to calculate the stress concentration factor Kt: a first 3D model with no partial circumferential slots, axial slots and radial holes, to calculate the reference hoop stress, and a second 3D model having the same dimensions and including the partial circumferential slots, axial slots and radial holes to calculate the peak hoop stress. Both models had the same loads applied to them. The stress concentration factor Kt was then calculated as the ratio between the peak hoop stress and the reference hoop stress.

The stress concentration factor Kt at the intersection of a radial hole and partial circumferential slot of a bearing ring similar to that shown in FIGS. 1-5 but where the axial slot has an circular bottom surface (curved cross-section) instead of a flat bottom surface was also calculated using CATIA V5. Parabolic elements were used and areas of high stress were refined. Two 3D models were used to calculate the stress concentration factor Kt: a first 3D model with no partial circumferential slots, axial slots and radial holes to calculate the reference hoop stress, and a second 3D model having the same dimensions and including the partial circumferential slots, axial slots and radial holes to calculate the peak hoop stress. Both models had the same loads applied to them. The stress concentration factor Kt was then calculated as the ratio between the peak hoop stress and the reference hoop stress.

The table below sets forth the Kt obtained for the two inner rings:

|  | Kt |
|---|---|
| Inner ring with axial slots having flat bottom wall | 3.92 |
| Inner ring with axial slots having circular bottom wall | 4.4 |

It can be seen that an inner ring with axial slots having an circular bottom wall has a stress concentration factor Kt which is approximately 12% higher than that of the inner ring 12 with axial slots 32 having a flat bottom wall 40 such as shown in FIGS. 1-5. In a particular embodiment, the configuration of the axial slots 32 with a flat bottom wall 40 thus provides for a significant advantage with respect to the minimization of the concentration of hoop stress in the inner ring 12.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A bearing assembly comprising:
an outer ring having an inner surface including an outer race;
an inner ring concentric with and surrounded by the outer ring, the inner ring having
an outer surface including two axially spaced apart shoulders and an inner race defined between the shoulders, the inner race being complementary to the outer race, and
an inner surface having a plurality of circumferentially spaced axial slots with a flat bottom wall defined therein, the inner surface also having a plurality of circumferentially spaced partial circumferential slots defined therein each intersecting one of the axial slots and extending circumferentially therefrom, and
the inner ring further having shoulder radial holes extending therethrough each from a respective one of the circumferential slots to a corresponding one of the shoulders, and race radial holes extending therethrough each from a respective one of the circumferential slots to a corresponding corner of the inner race, the radial holes being circumferentially offset from the axial slots;
a cage member received between the outer and inner rings and abutting the shoulders of the inner ring; and
a plurality of bearing elements supported by the cage member and received between the outer race and the inner race, the bearing elements allowing relative rotational motion between the outer and inner rings.

2. The assembly as defined in claim 1, wherein the partial circumferential slots are separated into first, second, third and fourth sets axially offset from one another, the partial circumferential slots of the first and second sets being located near one end of the inner ring with the partial circumferential slots of the first set being closest to the one end, the partial circumferential slots of the third and fourth sets being located near the other end of the inner ring with the partial circumferential slots of the fourth set being closest to the other end, the partial circumferential slots of the first and fourth sets each receiving one of the shoulder radial holes, and the partial circumferential slots of the second and third sets each receiving one of the race radial holes.

3. The assembly as defined in claim 2, wherein the partial circumferential slots of different ones of the sets are staggered around the circumference of the inner ring.

4. The assembly as defined in claim 1, wherein each of the axial slots is intersected by a single one of the partial circumferential slots.

5. The assembly as defined in claim 1, wherein the radial holes include a same number of the shoulder radial holes and of the race radial holes.

6. The assembly as defined in claim 1, wherein the partial circumferential slots are regularly circumferentially spaced apart around the circumference of the inner surface.

7. The assembly as defined in claim 1, wherein the inner race includes a groove defined in each corner, and the race radial holes extend from the respective circumferential slot to the groove.

8. The assembly as defined in claim 1, wherein each of the partial circumferential slots has a depth greater than a depth of the axial slots.

9. The assembly as defined in claim 1, wherein each of the radial holes has a constant diameter along a complete length thereof.

10. An inner ring for a bearing assembly, the inner ring comprising:

an outer surface defining an inner race extending between two circumferential shoulders;

an inner surface concentric with the outer surface and located radially inwardly thereof, the inner surface having a plurality of circumferentially spaced axial slots defined therein each having a flat axially extending bottom wall, and a plurality of circumferentially spaced partial circumferential slots defined therein each intersecting one of the axial slots and extending circumferentially therefrom around a respective portion of a circumference of the inner surface;

the inner ring having shoulder radial holes extending therethrough each from a respective one of the circumferential slots to a corresponding one of the shoulders;

the inner ring having race radial holes extending therethrough each from a respective one of the circumferential slots to a corresponding corner of the inner race; and the radial holes being circumferentially offset from the axial slots.

11. The inner ring as defined in claim 10, wherein the partial circumferential slots are separated into first, second, third and fourth sets axially offset from one another, the partial circumferential slots of the first and second sets being located near one end of the inner ring with the partial circumferential slots of the first set being closest to the one end, the partial circumferential slots of the third and fourth sets being located near the other end of the inner ring with the partial circumferential slots of the fourth set being closest to the other end, the partial circumferential slots of the first and fourth sets each receiving one of the shoulder radial holes, and the partial circumferential slots of the second and third sets each receiving one of the race radial holes.

12. The inner ring as defined in claim 11, wherein the partial circumferential slots of different ones of the sets are staggered around the circumference of the inner ring.

13. The inner ring as defined in claim 10, wherein each of the axial slots is intersected by a single one of the partial circumferential slots.

14. The inner ring as defined in claim 10, wherein the radial holes include a same number of the shoulder radial holes and of the race radial holes.

15. The inner ring as defined in claim 10, wherein the partial circumferential slots are regularly circumferentially spaced apart around the circumference of the inner surface.

16. The inner ring as defined in claim 10, wherein the inner race includes a groove defined in each corner, and the race radial holes extend from the respective circumferential slot to the groove.

17. The inner ring as defined in claim 10, wherein each of the partial circumferential slots has a depth greater than a depth of the axial slots.

18. The inner ring as defined in claim 10, wherein each of the radial holes has a constant diameter along a complete length thereof.

19. A method of lubricating a bearing assembly having a cage member retaining a plurality of bearing elements, the method comprising:

circulating a lubricating fluid axially along an inner surface of an inner ring of the bearing assembly following a plurality of distinct first paths;

circulating the lubricating fluid circumferentially from the first paths along the inner surface following a plurality of distinct second paths;

circulating the lubricating fluid radially from some of the second paths through the inner ring directly to shoulders defined in an outer surface of the inner ring and receiving the cage member; and circulating the lubricating fluid radially from the remaining second paths through the inner ring directly to corners of an inner race defined in the outer surface and receiving the bearing elements.

20. The method of claim 19, wherein circulating the lubricating fluid axially includes circulating the lubricating fluid along a flat bottom surface of a plurality of axial slots defined in the inner surface.

* * * * *